United States Patent Office 3,076,809
Patented Feb. 5, 1963

3,076,809
PROCESS FOR PREPARATION OF GLUTARIMIDE COMPOUNDS
Francis Johnson, West Newton, Mass., assignor to The Dow Chemical Company, Midland, Mich., a corporation of Michigan
No Drawing. Filed Feb. 1, 1960, Ser. No. 5,657
7 Claims. (Cl. 260—281)

This invention relates to a process for the preparation of 3-carboxymethylglutarimide compounds from methanetriacetic acid compounds.

It is a fundamental object of this invention to provide a method of preparing glutarimide compounds from methanetriacetic acid compounds, utilizing a procedure which makes it possible to obtain the glutarimides in a variety of substituted forms for use in the preparation of polymers, interpolymers and the like, as well as in subsequent synthesis.

Other objects and advantages of the invention will in part be obvious and in part appear hereinafter.

The invention, accordingly, is embodied in the process of preparing carboxymethylglutarimide compound starting with a mehanetriacetic acid or substituted variant thereof, converting the acid compound to the ammonium salt and, thereafter, heating to completion of gas evolution, and, in the operation, effecting a cyclization of the acid groups, while, at the same time, leaving the 3-carboxymethyl group as the free acid. In general, it is possible to start the process with a methane triacetic acid compound corresponding to the following formula

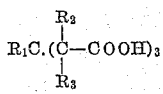

in which $R_1$ represents hydrogen or any organic radical, and by forming the ammonia salt by reaction with an ammonium compound in which the anion is any volatile anion, such as —$CO_3$, —Cl, acetate, formate, benzoate, formamide, and N-alkyl formamides, etc., and thereafter cyclicizing the triacetate moiety, there is formed a compound corresponding to the following drawing

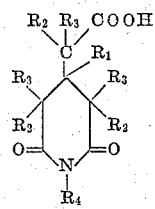

wherein the respective $R_1$, $R_{2-3}$ groups represent hydrogen or any organic radical of low molecular weight which does not interfere with cyclization, such as methyl, ethyl, propyl groups; $R_4$ is generally hydrogen or an alkyl group derived from the N-alkyl formamide used in the reaction. In general the ammonium salt used and the amide used should be formed with acids which are more volatile than the product sought. The resultant family of new compounds has remarkable versatility as a synthetic tool and in the formation of interpolymers of the acid-ester type, because the compounds carry such a variety of variously disposed functional groups.

For a better understanding of the details of the process of this invention, reference may be had to the following specific examples:

Example I

Methanetriacetic acid (1.7 grams) in water (4 milliliters) was treated with concentrated ammonia (7.5 milliliters; 28–30 percent $NH_3$) and the mixture heated on an oil bath to remove water (40 minutes). Heating was then continued at 200° for about 20 minutes—(5 minutes after all gas evolution ceased). The almost colorless glassy residue was taken up in a 1:1 mixture of ethyl acetate and ethanol. The solution was concentrated twice with the addition of ethanol each time to help remove ethyl acetate from the solution. On cooling, a crop of crystalline material was collected and air-dried, M.P. 175–8° (1.23 grams). The infrared spectrum of this material was identical with that of 3-carboxymethylglutarimide.

Example II

Methanetriacetic acid (19 parts) was mixed with formamide (4.5 parts) and the mixture placed in an oil bath at 100° C. The bath temperature was raised during 20 minutes to 200° C. (effervescence began at 175° C.) and maintained at this point until no more volatile distillate was collected (approximately 1 hour). The oil bath temperature was then raised to 230° C. for 5 minutes and the mixture then allowed to cool. The melt crystallized to a pale yellow crystalline solid. This was recrystallized from ethanol to give a highly crystalline product (14.5 parts, M.P. 176–9° C.). A sample of the material, twice recrystallized from ethanol, had melting point 179.5–80°. Analysis for elements gave: C, 49.2; H, 5.4; N, 8.3; theoretically required for $C_7H_9NO_4$; C, 49.12; H, 5.3; N, 8.18 percent). The infrared spectrum of the material was identical with that of 3-carboxymethyl-glutarimide.

Example III

Following the procedures of Examples I and II, the same compounds were prepared employing ammonium chloride, formamide and urea individually for the preliminary reactant material with the methanetriacetic acid compound. In general, the ammonia in the process can be replaced by formamide or any ammonium salt, or any amide, wherein the amide is formed from acid which is more volatile than the methanetriacetic acid compound it is sought to produce.

In other words, inasmuch as the cyclization is an unusual reaction in that the imide is produced without the formation of an amide in the 3-carboxymethyl position, it is essential not only to select as the ammonia reactant material one which will provide the nitrogen, but nitrogen held by means of an acid group more volatile than the methanetriacetic acid product sought. Methanetriacetic acid in the process is heated to a high temperature to produce cyclization and it should not be volatilized, but the availability of the ammonia in the medium containing the methanetriacetic acid is not affected by the volatility of the acid accompanying the ammonia.

In general, the preferred temperature range of operation is approximately 180° C., but temperatures as low as 150° and as high as 250° C. may be used. The time of reaction is not a critical variable in that the reaction takes place rather readily and total time may be as little as a few minutes or several hours, according to the temperature. Since it is a fusion reaction, no positive pressure is necessary, ambient pressure being adequate, although it is quite apparent that the reaction would take place at positive pressure and below atmospheric pressure. In adopting the ratio of reactants, the effective yield of the compound will, of course, be based upon the starting organic methanetriacetic acid and the amount of ammonia may be as little as one equivalent to a very large excess. When using formamide, a single equivalent of the formamide should be about the optimum. In general, I have found that operation in the absence of a solvent is perfectly satisfactory, but operation in a high boiling solvent would also be suitable. The yields of the reaction are satisfactory based upon the methanetriacetic acid used and, using formamide, that is, the less volatile forms of ammonia, the process can be made to approach 100 percent yield.

What is claimed is:

1. The method of forming carboxymethylglutarimide compounds corresponding to the following:

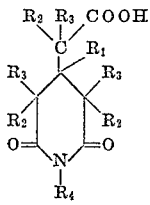

wherein the respective moieties designated $R_1$, $R_2$, $R_3$, $R_4$ are selected from the group consisting of hydrogen and lower alkyl groups, which comprises reacting a starting material corresponding to hte following $$R_1C(CR_2R_3COOH)_3$$

with an equivalent amount of an ammonia compound selected from the group consisting of, ammonia, amides of low molecular weight volatile monocarboxylic organic acids, ammonium salts of volatile acids, and mono-alkyl-N-substituted amides of volatile monocarboxylic organic acids, heating said mixture to a temperature in the range from about 150° C. to 350° C. for a time sufficient to complete reaction with said ammonia compound and evolution of gas including volatilization of acid residues, thereafter recovering said corresponding glutarimide product.

2. The method in accordance with claim 1 in which said reaction product is dissolved in an inert solvent and crystallized therefrom.

3. The method in accordance with claim 1 in which the starting materials are methane triacetate acid and formamide.

4. The method in accordance with claim 1 in which the starting materials are methane triacetate acid and ammonium carbonate.

5. The method in accordance with claim 1 in which the starting materials are methane triacetic acid and ammonium acetate.

6. The method in accordance with claim 1 in which the starting materials are methane triacetic acid and ammonium chloride.

7. The method in accordance with claim 1 in which the starting materials are methane triacetic acid and ammonia.

No references cited.